United States Patent
Mourani

(10) Patent No.: US 6,769,427 B1
(45) Date of Patent: Aug. 3, 2004

(54) SOLAR WATER HEATER

(76) Inventor: Magid Mourani, 62 Hudson Ter., Sleepy Hallow, NY (US) 10591

( * ) Notice: Subject to any disclaimer, the term of this patent is extended or adjusted under 35 U.S.C. 154(b) by 26 days.

(21) Appl. No.: 10/361,336

(22) Filed: Feb. 10, 2003

(51) Int. Cl.$^7$ .................................................. F24J 2/12
(52) U.S. Cl. ........................ 126/640; 126/643; 126/690
(58) Field of Search ................................ 126/640, 641, 126/638, 639, 684, 690, 643

(56) References Cited

U.S. PATENT DOCUMENTS

| | | | |
|---|---|---|---|
| 4,212,593 A | * 7/1980 | Chadwick | 417/53 |
| 4,222,372 A | * 9/1980 | Bogatzki | 126/655 |
| 4,249,515 A | 2/1981 | Page | 126/438 |
| 4,325,360 A | * 4/1982 | Kelley | 126/651 |
| 4,329,979 A | 5/1982 | Frank | 126/422 |
| 4,397,300 A | * 8/1983 | Johnston | 126/584 |
| 5,351,488 A | * 10/1994 | Sorensen | 60/641.11 |
| 5,462,047 A | 10/1995 | Kleinwachter et al. | 126/639 |
| 5,507,275 A | * 4/1996 | Clark | 126/627 |
| 5,894,836 A | * 4/1999 | Wu et al. | 126/617 |
| 6,119,682 A | 9/2000 | Hazan | 126/638 |

FOREIGN PATENT DOCUMENTS

JP 2003028514 A * 1/2003 ............. F24J/2/12

* cited by examiner

*Primary Examiner*—Ira S. Lazarus
*Assistant Examiner*—James G. Barrow
(74) *Attorney, Agent, or Firm*—Goldstein Law Offices, P.C.

(57) ABSTRACT

A solar water heater comprising a water tank, a solar heating compartment for heating water, and an air pump. The water tank and the solar heating compartment are both substantially cylindrical, and the bottom surface of the heating compartment overlaps the top surface of the water tank. The solar heating compartment has an upper surface and a side surface which are substantially constructed from transparent materials. The heating compartment contains water tubing in communication with water in the water tank and at least one stainless steel parabolic reflector positioned for reflecting incident sunlight upon the water tubing for absorption. The water tubing terminates in at least one hot water outlet. The air pump is in communication with the water tubing within the solar heating compartment. Operation of the air pump causes a stream of water to continuously flow from the water tank to the hot water outlets by the siphoning effect.

8 Claims, 3 Drawing Sheets

SOLAR WATER HEATER

BACKGROUND OF THE INVENTION

1. Field of the Invention

The invention relates to heating apparatus and, more particularly to a solar water heater with an integrated storage tank.

2. Description of the Related Art

U.S. Pat. No. 4,249,515 to Page appears to show a solar heater comprised of a parabolic reflector for concentrating solar energy to heat a fluid. However, Page contemplates preheating of the fluid in one compartment and principal heating of the fluid in a second compartment. Accordingly, Page does not provide a solar water heater which reflects all incident sunlight onto a single compartment for conversion into heat energy.

U.S. Pat. No. 5,462,047 to Kleinwachter appears to show a solar water heater with a tilted, flat solar radiation absorber panel and a storage tank that performs thermosiphoning when the tank is full, whereby hot water will rise relative to cooler water. However, Kleinwachter contemplates heating cold water by direct absorption of solar energy, and subsequently circulating the heated water by thermosiphoning. Accordingly, Kleinwachter does not provide a solar water heater in which reflected sunlight is directed to a single location.

U.S. Pat. No. 6,119,682 to Hazan appears to show a solar water heater with a tilted, flat solar radiation absorber panel. However, Hazan contemplates two conduits for fluid communication between portions of the absorber panel and the storage tank to complete a thermosyphonic path between the absorber panel and the tank. Accordingly, Hazan does not provide a water heater in which reflected sunlight is directed to a single location.

U.S. Pat. No. 4,329,979 to Frank appears to show a solar water heater capable of being used in conjunction with an existing hot water heater. However, Frank comprises a flat absorber panel and does not contemplate a solar water heater which focuses light reflected from a parabolic reflector onto tubing which contains water.

While these units may be suitable for the particular purpose employed, or for general use, they would not be as suitable for the purposes of the present invention as disclosed hereafter.

SUMMARY OF THE INVENTION

It is an object of the invention to produce a solar water heater which produces a sufficient amount of hot water for a variety of activities. Accordingly, the solar water heater has a parabolic reflector which focuses solar energy onto tubing which contains water, and thereby produces a sufficient amount of hot water for a variety of activities.

It is another object of the invention to produce a solar water heater which is energy-efficient and environmentally safe. Accordingly, the water heater is powered by solar energy, and does not need electricity to operate.

It is yet another object of the invention to produce a solar water heater which is portable. Accordingly, the solar water heater is available in sizes which are small enough to be easily transported by an average user.

It is still yet another object of the invention to produce a solar water heater which is not unduly expensive. Accordingly, the solar water heater is constructed from plastic, stainless steel, and copper and its cost is not prohibitive.

It is an additional object of the invention to produce a solar water heater which may be used to provide hot water in emergency situations. Accordingly, the solar water heater may be a component of emergency survival kits and is capable of providing hot water in emergency situations.

The invention is a solar water heater comprising a water tank, a solar heating compartment for heating water, and an air pump. The water tank and the solar heating compartment are both substantially cylindrical, and the bottom surface of the heating compartment overlaps the top surface of the water tank. The solar heating compartment has an upper surface and a side surface which are substantially constructed from transparent materials. The heating compartment contains water tubing in communication with water in the water tank and at least one stainless steel parabolic reflector positioned for reflecting incident sunlight upon the water tubing for absorption. The water tubing terminates in at least one hot water outlet. The air pump is in communication with the water tubing within the solar heating compartment. Operation of the air pump causes a stream of water to continuously flow from the water tank to the hot water outlets by the siphoning effect.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
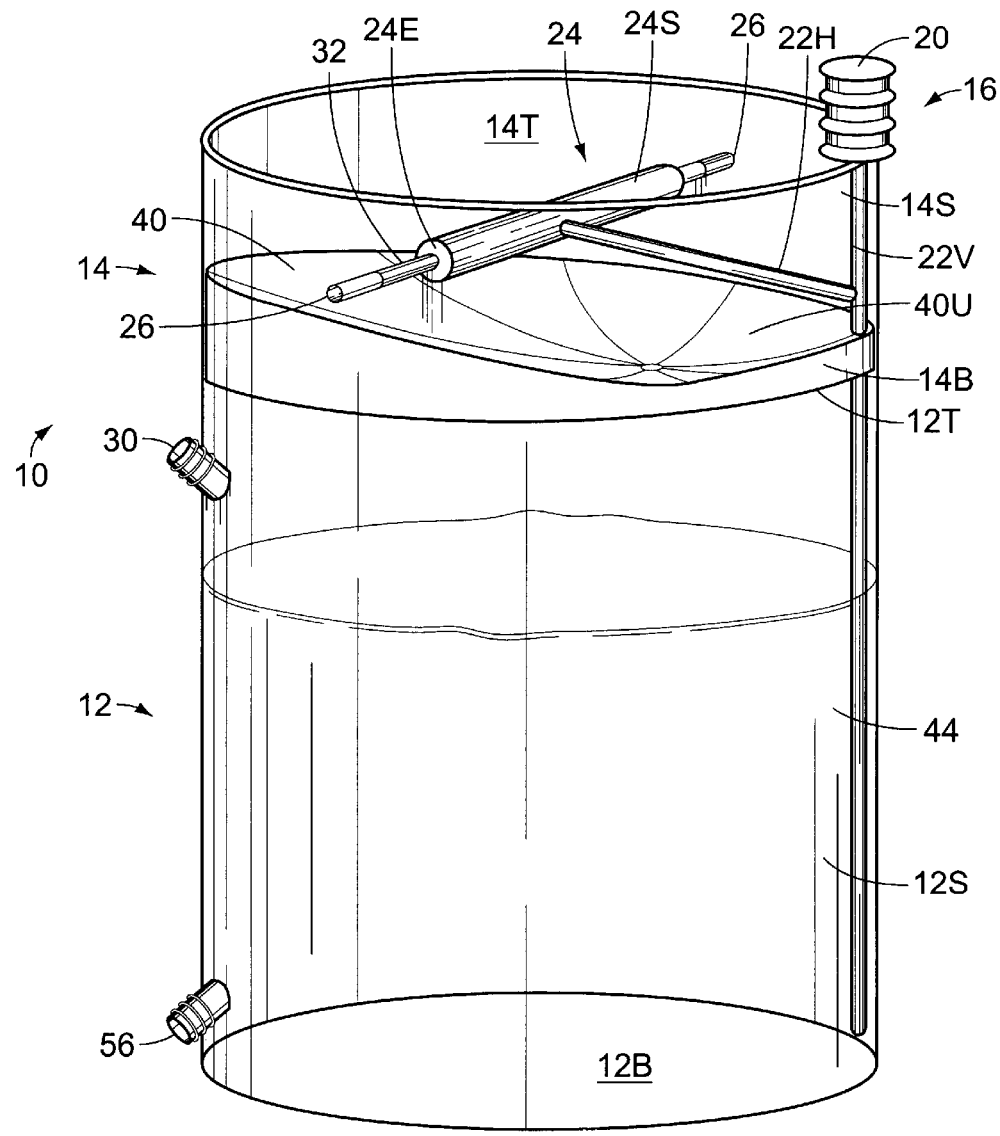
FIG. 1 is a perspective view of the solar water heater with a single parabolic reflector.

FIG. 1 illustrates a perspective view of the solar water heater 10 having a single stainless steel parabola 40 for collecting sunlight. The solar heater 10 comprises a cylindrical water tank 12 and a substantially cylindrical solar heating compartment 14. The water tank 12 has a top surface 12T, a bottom surface 12B, a side surface 12S, and a water tank inlet connection 30 and a water tank drain 56, both extending fully through the side surface 12S. The water tank 12 is shown substantially filled with water 44.

In an alternate embodiment, the solar heating compartment has threads around the periphery of its bottom surface, and the water tank has opposing threads around the periphery of its top surface, thereby allowing attachment of the solar heating compartment to the water tank by selectively threading the solar heating compartment within the water tank. In this embodiment, obviously, it is possible to dispense with the water tank inlet connection and the water tank drain, because the water tank may be filled by pouring water directly into the water tank.

The heating compartment 14 has a circular bottom surface 14B which overlaps the top surface 12T of the water tank 12, and a top surface 14T and a side surface 14S which are both constructed from a transparent material such as glass or plastic. The bottom surface 14B is preferably constructed from a material which insulates against heat loss from the water tank 12. The heating compartment 14 has a substantially centrally located cylindrical copper water reservoir 24 having two flat circular end portions 24E and a surface 24S, cylindrical copper water tubing 32 extending from both end portions 24E, and two hot water outlets 26 extending from the water tubing 32 fully through the side 14S of the heating compartment 14, whereby hot water may be released for use. In an alternate embodiment, a single hot water outlet may be provided. The heating compartment 14 also comprises a single parabolic reflector 40 having a curved upper surface 40U which is oriented facing upward. The parabolic reflector 40 is constructed from highly reflective stainless steel and causes the incident rays of sunlight to be reflected and converged at a focal point of the parabola substantially upon the surface 24S of the water reservoir 24. In this regard, the copper which is used for the water reservoir 24 should preferably not be highly reflective, because it is desirable that most of the light which is reflected from the parabolic reflector 40 should be absorbed by the water reservoir 24 in order to maximize the heating efficiency of the solar water heater 10.

The solar heater 10 further comprises an air pump 16, in communication with the water reservoir 24 and the water tubing 32 extending therefrom. The air pump 16 has an air pump handle 20, vertical air pump tubing 22V, and horizontal air pump tubing 22H. The air pump 16 creates a partial vacuum in the water tubing 32, thereby causing water to flow from the water tank 12 into the water reservoir 24 and the water tubing 32. Once the siphoning of water has begun, the air pump 16 is no longer needed to maintain a flow of water. Water will continue to flow from the hot water outlets 26 of the solar water heater 10 until the partial vacuum is released by opening the air pump tubing to the atmosphere. In order that the flow of water from the solar water heater 10 remains uninterrupted, the hot water outlet 26 is generally connected to a hose having an outlet which is maintained at a lower level than the water 44 in the water tank 12, thereby preventing the siphon from "breaking;". An electric pump may be utilized instead of a manual air pump.

The parabolic reflector 40 need not be fixed in its position above the water tank 12. Rather, the parabolic reflector 40 may be housed separately from the water tubing 32 within a transparent reflector housing attached to the water tank 12 by a hinge, thereby resulting in a storage position wherein the reflector housing substantially abuts the water tank 12, and also a deployed position wherein the reflector housing has been swiveled upon the hinge to a position which results in maximum absorption of the reflected light by the surface 24S of the water reservoir 24. Additionally, alternative shapes of the water tank 12 are also possible.

Figure 2:
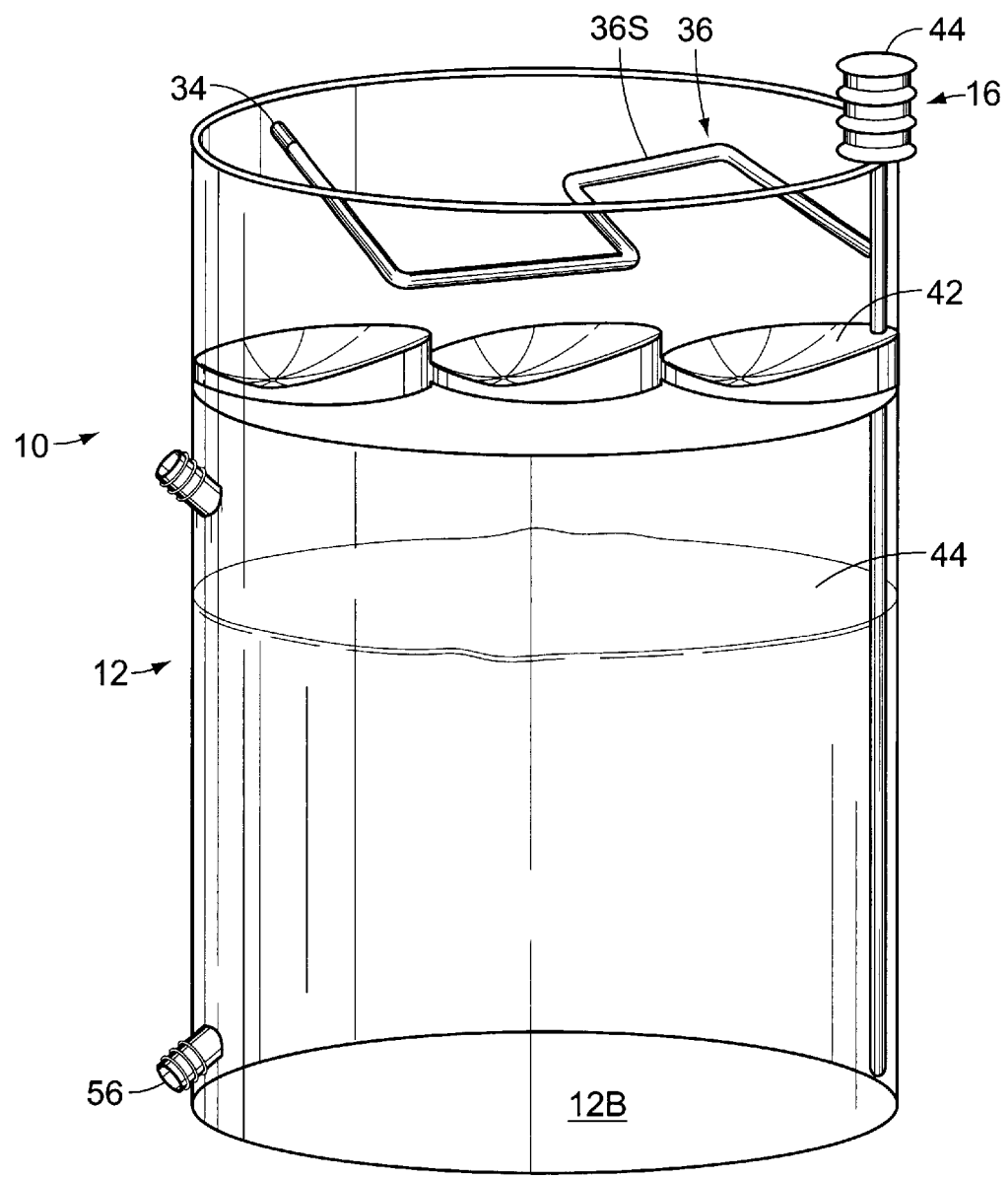
FIG. 2 is a perspective view of the solar water heater with a plurality of parabolic reflectors.

FIG. 2 illustrates an alternate structural design for the solar water heater 10 comprising a plurality of smaller stainless steel parabolic reflectors 42 instead of the single, larger parabolic reflector 40 illustrated in FIG. 1. In FIG. 2, there is no centrally located water reservoir 24 as is illustrated in FIG. 1. Rather, there is a convoluted stretch of water tubing 36 having surfaces 36S for maximizing absorption of light reflected by the parabolic reflectors 42. The parabolic reflectors 42 are situated at positions which result in the reflected light from each parabola 42 converging at a focal point on a different portion of the surfaces 36S of the water tubing 36. In this design, only one hot water outlet 34 is present. In all other respects, the design shown in FIG. 2 may be similar or identical to the single parabolic reflector model illustrated in FIG. 1.

Figure 3:
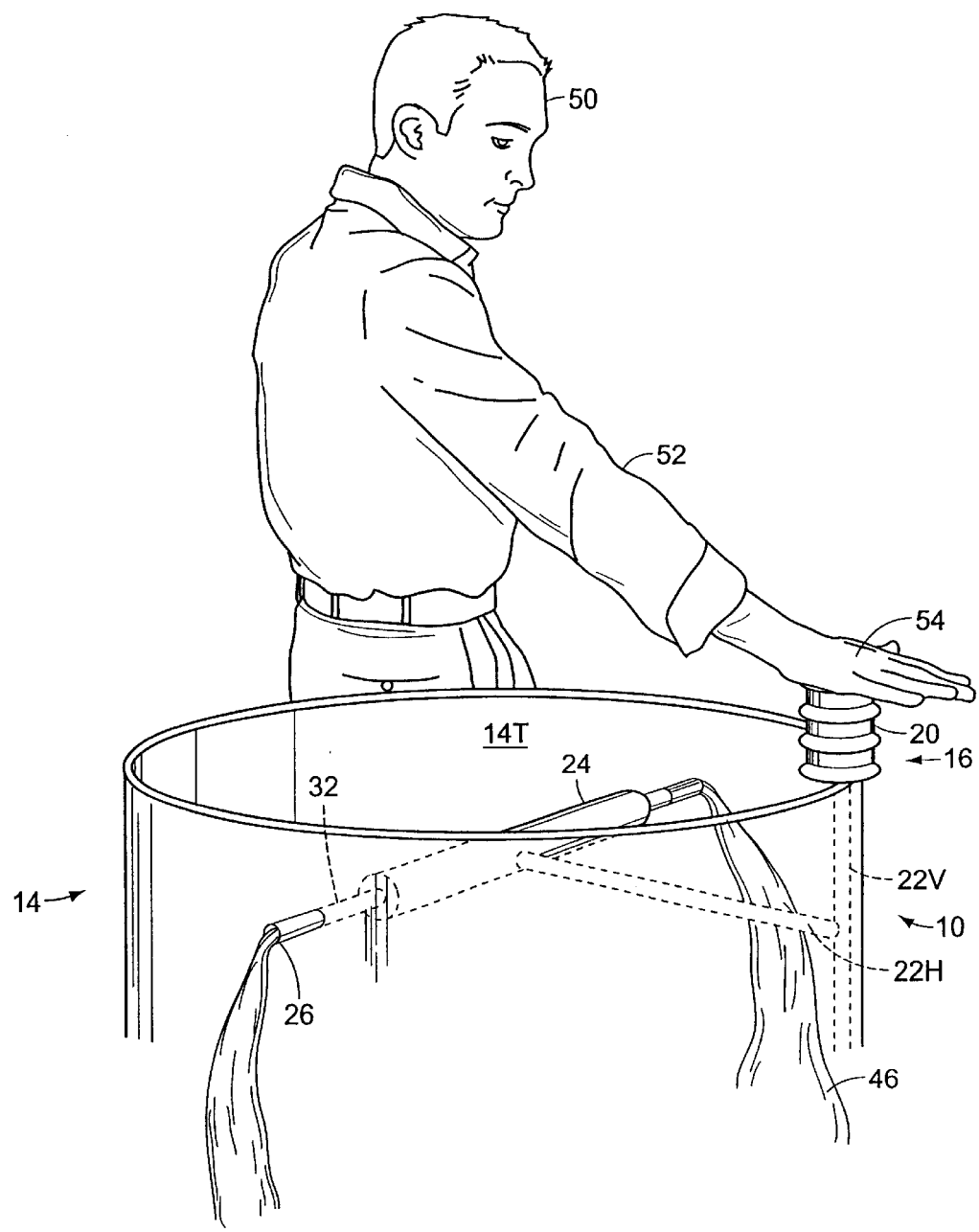
FIG. 3 is a perspective view of a user employing the air pump to begin the flow of water.

FIG. 3 illustrates a perspective view of a user 50 having an arm 52 having a hand 54 initiating the flow water from the water tubing 32 by creating a partial vacuum within the water tubing 32 and the water reservoir 24 by alternately pressing upon and releasing the air pump handle 20. Once the stream 46 has begun to flow, the flow will continue until the water tank 12 has been emptied or until the siphon effect has been "broken " by opening the tubing which is connected to the air pump 16 to the atmosphere.

In use, a user 50 having an arm having a hand positions the solar water heater 10 at a location which maximizes the amount of sunlight impinging upon the parabolic reflector 40 or parabolic reflectors 42. The user 50 then fills the water tank 12 with water 44 at the water inlet connection 30. The user fills the water tubing 32 with water by selectively activating the air pump 16 until water flows from the water tank 12 into the water reservoir 24 and the water tubing 32. After the water in the water reservoir 24 has been sufficiently heated, the user 50 causes a stream 46 of hot water to flow from the hot water outlets 26 by repeatedly pressing with the hand 54 and arm 52 upon the air pump handle 20 until a vacuum created within the water tubing 32 and the water reservoir 24 by the air pump 16 causes water to continuously flow by means of the siphon effect. When the solar water heater 10 is no longer deployed, the water 44 in the tank 12 which has not been used may be emptied from the water tank drain 56 and the solar water heater 10 is moved to a storage location.

In conclusion, herein is presented a solar water heater for producing hot water to be used for a variety of purposes. The invention is illustrated by example in the drawing figures, and throughout the written description. It should be understood that numerous variations are possible, while adhering to the inventive concept. Such variations are contemplated as being a part of the present invention.

What is claimed is:

1. A solar water heater comprising:
   a water tank for holding water;
   a solar heating compartment for heating water having a top surface, a bottom surface, and at least one side surface wherein the top surface and side surface are constructed from transparent materials, said heating compartment further containing water tubing in communication with water in the water tank, a hot water outlet extending fully through the side surface of the heating compartment whereby water which has been heated within the water tubing may be released from the heating compartment, and at least one parabolic reflector positioned to reflect incident sunlight which has entered the heating compartment upon the water tubing for absorption thereupon, said heating compartment being sealed from the atmosphere to prevent the escape of heat into the atmosphere; and
   an air pump in communication with the water tubing within the solar heating compartment which may be selectively activated to create a partial vacuum within the water tubing, thereby causing water to continuously flow from the water tank through the water tubing and out from the hot water outlet by the siphoning effect.

2. The solar water heater as recited in claim 1, wherein the solar heating compartment comprises a plurality of parabolic reflectors and wherein the water tubing is convoluted, thereby resulting in a larger surface area of water tubing upon which light reflected from the parabolic reflectors may be absorbed.

3. The solar water heater as recited in claim 2, wherein both the water tank and the solar heating compartment are substantially cylindrical, both having a flat, circular top surface, a flat, circular bottom surface and a curved side surface, wherein the bottom surface of the heating compartment substantially overlaps the top surface of the water tank.

4. The solar water heater as recited in claim 3, wherein the bottom surface of the heating compartment is constructed from an insulator material, for effectively insulating against heat loss from the water tank to the atmosphere.

5. The solar water heater as recited in claim 4, wherein the water tubing within the solar heating compartment comprises tubing which is of wider diameter and tubing which is of narrower diameter, wherein the tubing of wider diameter comprises a water reservoir, which is substantially centrally located at a position at a focal point of the parabola at which maximal absorption of light reflected upon it by the parabolic reflector will occur.

6. The solar water heater as recited in claim 5, wherein the parabolic reflector is constructed from highly reflective stainless steel.

7. A method of using a solar water heater for heating water by a user, said solar water heater comprising a water tank for holding water, and a solar heating compartment for heating water having a top surface, a bottom surface, and at least one side surface wherein the top surface and side surface are constructed from transparent materials, said heating compartment further containing water tubing having a surface and in communication with water in the water tank, a hot water outlet whereby water which has been heated within the water tubing may be released from the heating compartment, and at least one parabolic reflector positioned to reflect incident sunlight which has entered the heating compartment upon the surface of the water tubing for absorption thereupon, said solar water heater further comprising an air pump in communication with the water tubing within the solar heating compartment which may be selectively activated to create a partial vacuum within the water tubing, thereby causing water to continuously flow from the water tank through the water tubing and out from the hot water outlet by the siphoning effect, comprising the steps of:

a) positioning the solar water heater at a location where sunlight directly shines upon the at least one parabolic reflector in the solar heating compartment;

b) filling the water tank by adding water via the water tank inlet connection;

c) filling the water tubing with water by selectively activating the air pump until water fills the water tubing;

d) heating the water in the water tubing by absorption by the surface of the water tubing of reflected sunlight from the parabolic reflector;

e) opening the hot water outlet of the solar heating compartment, and thereby releasing hot water; and f) emptying the water from the water tank when the solar water heater is no longer being deployed by opening the water tank drain.

8. The method of using a solar water heater as recited in claim 7, wherein the water tubing within the solar heating compartment comprises tubing which is of wider diameter and tubing which is of narrower diameter, wherein the tubing of wider diameter comprises a water reservoir, which is substantially centrally located at a position at which maximal absorption of light reflected upon it by the parabolic reflector will occur, and wherein the step of heating the water in the water tubing comprises heating the water within the water reservoir.

\* \* \* \* \*